(12) United States Patent
Huang

(10) Patent No.: US 9,131,377 B2
(45) Date of Patent: Sep. 8, 2015

(54) METHOD AND APPARATUS FOR UNLOCKING OPERATING SYSTEM

(71) Applicant: Huawei Device Co., Ltd., Shenzhen (CN)

(72) Inventor: Kai Huang, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/732,046

(22) Filed: Dec. 31, 2012

(65) Prior Publication Data

US 2013/0122866 A1    May 16, 2013

Related U.S. Application Data

(63) Continuation of application No. PCT/CN2011/082762, filed on Nov. 23, 2011.

(30) Foreign Application Priority Data

Dec. 29, 2010 (CN) .......................... 2010 1 0612299

(51) Int. Cl.
*H04B 1/06* (2006.01)
*H04M 3/00* (2006.01)
(Continued)

(52) U.S. Cl.
CPC .............. *H04W 12/06* (2013.01); *G06F 21/31* (2013.01); *G06F 21/6281* (2013.01);
(Continued)

(58) Field of Classification Search
CPC ............. H04B 1/06; H04B 1/38; H04M 3/00; H04M 1/00; H04M 1/66; H04M 1/673; H04W 12/06; G06F 21/31; G06F 21/6281; G06F 21/81; G06F 21/14; G06F 21/00; G06F 12/26; G06F 2221/21; G06F 2221/2147; G06F 2221/2105; G06F 2221/2131
USPC ........... 455/410–411, 414.1, 423, 425, 550.1, 455/556.2, 26.1, 418–420, 557–558, 455/565–566; 380/247–250
See application file for complete search history.

(56) References Cited

U.S. PATENT DOCUMENTS 6,950,647 B2 * 9/2005 Ko ................................ 455/411
7,373,137 B2 * 5/2008 Lauridsen et al. ............ 455/410
(Continued)

FOREIGN PATENT DOCUMENTS

CN         101634925 A      1/2010
CN         101827148 A      9/2010
(Continued)

OTHER PUBLICATIONS

Translation of Rejection Decision dated Apr. 25, 2013 in connection with Chinese Patent Application No. 201010612299.8.
(Continued)

*Primary Examiner* — Meless Zewdu

(57) ABSTRACT

Embodiments of the present invention provide a method and an apparatus for unlocking an operating system, which are used to unlock the system with personal information data when a user forgets a password, thereby increasing a probability of successful unlocking of the user. The method of the embodiment of the present invention includes: when a user fails in unlocking the system via an unlock pattern in an unlocking interface for pattern unlocking, displaying an unlocking interface for personal information authentication, and matching personal information input by the user with personal information pre-stored in a local database.

13 Claims, 3 Drawing Sheets

(51) Int. Cl.
*H04B 1/38* (2015.01)
*H04M 1/00* (2006.01)
*H04W 12/06* (2009.01)
*G06F 21/31* (2013.01)
*G06F 21/62* (2013.01)
*G06F 21/81* (2013.01)

(52) U.S. Cl.
CPC ....... *G06F 21/81* (2013.01); *G06F 2221/2105* (2013.01); *G06F 2221/2131* (2013.01); *G06F 2221/2147* (2013.01)

(56) References Cited

U.S. PATENT DOCUMENTS

| | | | |
|---|---|---|---|
| 8,555,334 B2* | 10/2013 | Asano | 726/2 |
| 2003/0087627 A1* | 5/2003 | Cannon | 455/404 |
| 2005/0050208 A1* | 3/2005 | Chatani | 709/229 |
| 2005/0060554 A1* | 3/2005 | O'Donoghue | 713/183 |
| 2006/0230229 A1* | 10/2006 | Getzinger | 711/118 |
| 2007/0115091 A1* | 5/2007 | Bandaru | 340/5.8 |
| 2009/0083850 A1* | 3/2009 | Fadell et al. | 726/19 |
| 2009/0098856 A1* | 4/2009 | Hsu | 455/410 |
| 2009/0165125 A1* | 6/2009 | Brown et al. | 726/21 |
| 2009/0193514 A1* | 7/2009 | Adams et al. | 726/17 |
| 2009/0282247 A1* | 11/2009 | Kirkup et al. | 713/168 |
| 2010/0257490 A1* | 10/2010 | Lyon et al. | 715/863 |
| 2010/0299745 A1* | 11/2010 | Karppinen et al. | 726/18 |
| 2011/0107435 A1* | 5/2011 | Tawara | 726/28 |
| 2011/0109433 A1* | 5/2011 | Kuenzi et al. | 340/5.73 |
| 2013/0122866 A1* | 5/2013 | Huang | 455/411 |

FOREIGN PATENT DOCUMENTS

| | | |
|---|---|---|
| CN | 101866409 A | 10/2010 |
| CN | 102096546 A | 6/2011 |
| JP | 2005339071 A | 12/2005 |
| JP | 2006-129267 | 5/2006 |
| JP | 2008158763 A | 7/2008 |

OTHER PUBLICATIONS

Supplementary European Search Report dated Apr. 3, 2013 in connection with European Patent Application No. EP 11 85 4392.
Einar Tysen, "Unlock Android phone after too many pattern attempts", Jan. 8, 2010, p. 1-18.
Escosuave, "Question, what if I forgot my visual code thing pattern", Nov. 29, 2008, 4 pages.
Staulkor, "How-to-Root, Hack, and Flashing your G1//Dream Read first!!!", xda-developers.com, Nov. 8, 2008, 2 pages.
Partial translation of Office Action dated Apr. 11, 2012 in connection with Chinese Patent Application No. 201010612299.8.
Partial translation of Office Action dated Oct. 8, 2012 in connection with Chinese Patent Application No. 201010612299.8.
"Web Posting Method", Digital Camera Magazine, vol. 9, Jun. 1, 2008, pp. 164-165.
International Search Report dated Mar. 8, 2012 in connection with International Patent Application No. PCT/CN2011/082762.

* cited by examiner

METHOD AND APPARATUS FOR UNLOCKING OPERATING SYSTEM

CROSS-REFERENCE TO RELATED APPLICATIONS

This application is a continuation of International Application No. PCT/CN2011/082762, filed on Nov. 23, 2011, which claims priority to Chinese Patent Application No. CN 201010612299.8, filed on Dec. 29, 2010, both of which are hereby incorporated by reference in their entireties.

TECHNICAL FIELD

The present invention relates to the field of information security, and in particular, to a method and an apparatus for unlocking an operating system.

BACKGROUND

With the rapid development of information technologies, an operating system plays a more and more important role in people's lives. The operating system is a collection of system software that controls operation of other programs, manages system resources and provides an operation interface for a user. Commonly used operating systems include a computer operating system (such as a windows operating system), a mobile phone operating system (such as an Android operating system) and so on. Attentions should be paid to data security protection while data is conveniently and rapidly managed by the user using the operating system. For a user of an ordinary mobile phone operating system, data security is protected through a locking function of the mobile phone operating system, for example, a pattern lock is set in an Android operating system, and a mobile phone user needs to input a pattern lock password to unlock a mobile phone before performing the next operation on mobile phone data. Meanwhile, when the mobile phone user forgets the password, how the operating system authenticates the identity of the current user to protect the data security in the mobile phone is also a key problem to be solved.

In the prior art, when the user of the Android operating system of the mobile phone unlocks the mobile phone by using the pattern lock password, the system performs authentication on the password input by the user and records the number of times when the user inputs a wrong password. Unlocking is not allowed if the password is wrong, and if the user continue to input the wrong password, processing is carried out based on the following two cases:

1. When the user does not establish a Google account bound with the mobile phone:

The unlocking can be implemented only after the user inputs the correct password on a pattern lock interface; otherwise, the system interface stays on an unlocking interface of the pattern lock.

2. When the user has established the Google account bound with the mobile phone:

After the user inputs the wrong password for five times, a button of "Forget the pattern?" will appear on the interface of the operating system, and the user can click the button to enter an interface for unlocking via the Google account, and then input, on this interface, the Google account and a password that are bound with the mobile phone, to unlock the mobile phone. If the user does not use the account for unlocking at this time, but still continue to input the wrong password on the pattern lock interface, when the number of wrong times reaches 15, the system will prompt that the user will be forced to use the Google account for unlocking if the wrong password is input for five more times, that is, the user has to perform unlocking via the Google account after consecutively inputting the wrong pattern password for 20 times. If the user fails to input a correct Google account and password, the mobile phone stays on an unlocking interface of the Google account and does not return to the unlocking interface of the pattern lock.

In the foregoing technical solution, when forgetting the pattern lock password, the user can only log in to the Google account bound with the mobile phone to unlock the pattern lock of the mobile phone; and the user cannot unlock the pattern lock of the mobile phone if the user does not bind a Google account with the mobile phone; or the mobile phone will stay on the unlocking interface of the Google account when the user forgets the account number or password of the Google account and inputs the wrong password for a certain number of times, and in this case, the user cannot return to the pattern unlocking interface for unlocking even if the user recalls the password, and the password can be cleared only by restoring factory defaults or upgrading the operating system, but all user data in the mobile phone may be lost as a result, which will cause great trouble to the user.

SUMMARY

Embodiments of the present invention provide a method and an apparatus for unlocking an operating system, which are capable of making full use of personal information data stored in the operating system by a user, so that the user may unlock the system with the personal information data when forgetting a password, increasing a probability of successful unlocking of the user.

A method for unlocking an operating system, provided in an embodiment of the present invention, includes: when a user fails in unlocking the system via an unlock pattern in an unlocking interface for pattern unlocking, displaying an unlocking interface for personal information authentication; receiving personal information input by the user; and matching the personal information input by the user with personal information pre-stored in a local database.

An apparatus for unlocking an operating system, provided in an embodiment of the present invention, includes: a display unit, configured to, when a user fails in unlocking the system via an unlock pattern in an unlocking interface for pattern unlocking, display an unlocking interface for personal information authentication; a receiving unit, configured to receive personal information input by the user; and a matching unit, configured to match the personal information input by the user with personal information pre-stored in a local database.

It can be seen from the foregoing technical solutions that, the embodiments of the present invention have the following advantages: When a user fails in unlocking through a pattern unlocking interface, unlocking interface requiring the user to input the personal information for authentication is displayed, when the personal information input by the user is received, and matching is performed on the personal information input by the user and the personal information pre-stored in the local database. Because the personal information is easy to remember for the user, the user generally unlocks the system in a manner of inputting the personal information to pass the authentication of the operating system, which increases the probability of successful unlocking of the user, and reduces a probability that the user loses user data due to the unlocking.

BRIEF DESCRIPTION OF THE DRAWINGS

To illustrate technical solutions in embodiments of the present invention or in the prior art more clearly, accompanying drawings required for describing the embodiments or the prior art are introduced briefly in the following. Apparently, the accompanying drawings in the following description merely show some embodiments of the present invention, and persons of ordinary skill in the art can derive other drawings from these drawings without creative efforts.

DETAILED DESCRIPTION

An embodiment of the present invention provides a method for unlocking an operating system, which is used to increase a probability of successful unlocking of a user, and reduces a probability that the user loses user data due to unlocking. An embodiment of the present invention further provides an apparatus for unlocking an operating system. Detailed descriptions are provided as follows.

For convenience in illustration, each of the embodiments of the present invention takes an Android operating system in a mobile phone as an example. It can be understood that the Android system of the mobile phone is only a specific example of an operating system, and the method for unlocking an operating system provided in the embodiment of the present invention can be applied to other operating systems of the same type.

Figure 1:
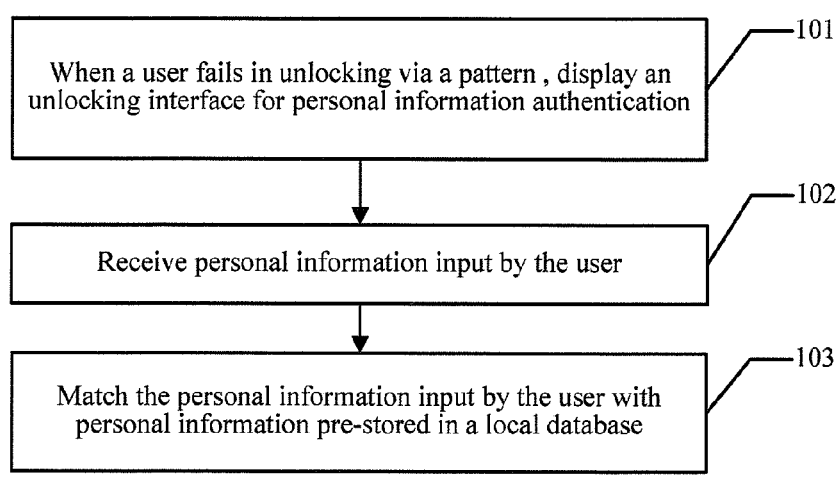
FIG. 1 is a schematic diagram of an embodiment of a method for unlocking an operating system according to an embodiment of the present invention.

Referring to FIG. 1, an embodiment of a method for unlocking an operating system in the embodiments of the present invention includes:

101: When a user fails in unlocking via a pattern, display an unlocking interface for personal information authentication.

During a process of using a mobile phone, the user inevitably stores a large amount of user-related personal information in the mobile phone, and the personal information may be information in the mobile phone, such as an address book, short messages and multimedia messages received and sent by the user, and a personal call record. The personal information is closely related to individual conditions of the mobile phone user, generally only the user knows specific content of the personal information in the mobile phone, and the personal information is hardly forgotten for it is familiar to the user; therefore, the personal information may help the user to unlock the system when the user forgets the pattern lock password.

In this embodiment, when the user fails in unlocking through a pattern unlocking interface, the operating system displays an unlocking interface requiring the user to input the personal information for authentication. A specific operation process of inputting the personal information for authentication will be illustrated in detail in a subsequent embodiment.

In step 101, the unlocking interface requiring the user to input the personal information for authentication may be displayed when the user fails in the unlocking via the pattern, and may also be displayed when the user fails in unlocking in other unlocking manners. The "other unlocking manners" may be password unlocking, gesture unlocking, sound unlocking, fingerprint unlocking and so on. In the embodiment of the present invention, for convenience in description, "pattern unlocking" is taken as an example for illustration. It can be understood that the "pattern unlocking" in the embodiment of the present invention may also be replaced with other unlocking manners, such as the password unlocking, gesture unlocking, sound unlocking, fingerprint unlocking and so on.

102: Receive personal information input by the user.

The personal information input by the user is received by an Android system of the mobile phone, and the personal information is input for authentication according to a requirement of the unlocking interface in step 101.

103: Match the personal information input by the user with personal information pre-stored in a local database.

In this embodiment, generally a large amount of personal information of the user is stored in the local database of the mobile phone, for example, contact information of each contact person in the address book, contact information of a contact person contained in the received and sent short messages of the mobile phone, contact information of a contact person contained in incoming and outgoing calls, and other personal information of the user. When the personal information is input by the user in step 102, the Android system of the mobile phone matches the personal information input by the user with the personal information pre-stored in the local database, and according to whether the matching is successful, decides whether the system is unlocked.

It should be noted that the matching process may be implemented by the prior art, for example, the database stored in the mobile phone may be queried for data information related to the personal information, through a program preset in the mobile phone, and matching is performed on the found data information and the personal information input by the user. It can be understood that the matching process may also be implemented by other prior art, which is not specifically limited herein.

In this embodiment, after the user fails in unlocking through the pattern unlocking interface, the unlocking interface requiring the user to input the personal information for authentication is displayed, when the personal information input by the user is received, and matching is performed on the personal information input by the user and the personal information pre-stored in the local database. Because the personal information is easy to remember for the user, the user generally can unlock the system in a manner of inputting the personal information to pass the authentication of the operating system.

Figure 2:
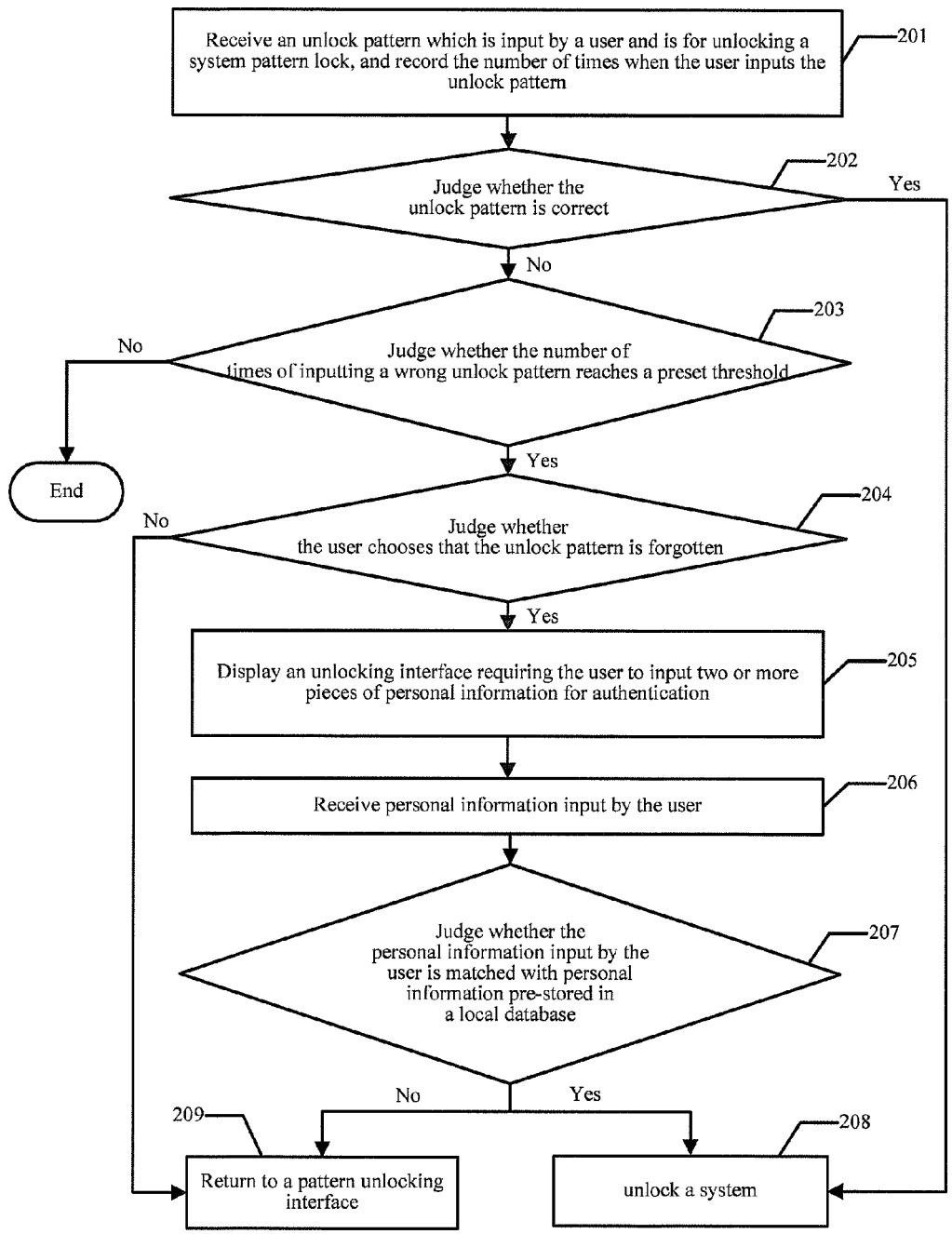
FIG. 2 is a schematic diagram of another embodiment of an method for unlocking an operating system according to an embodiment of the present invention.

For convenience in understanding, the method for unlocking an operating system in the embodiments of the present invention is described below with another embodiment. Referring to FIG. 2, an embodiment of a method for unlocking an operating system in the embodiments of the present invention includes:

201: Receive an unlock pattern which is input by a user and is for unlocking a system pattern lock, and record the number of times when the user inputs the unlock pattern.

In an Android system, the mobile phone user firstly tries to unlock the pattern lock. The Android system receives an unlock pattern input by the user, and the unlock pattern is used for unlocking the pattern lock set by the system, and records the number of times when the user inputs the unlock pattern.

202: Judge whether the unlock pattern is correct.

The Android system judges whether the unlock pattern for unlocking the system pattern lock is correct. If correct, step 207 is performed, and if wrong, the number of times when the user inputs a wrong unlock pattern is recorded.

203: Judge whether the number of times of inputting the wrong unlock pattern reaches a preset threshold.

If the operating system records that the number of times when the user inputs the wrong unlock pattern reaches the preset threshold, step 204 is performed.

It should be noted that, the setting of the preset threshold may be the same as that in the prior art. For example, the threshold may be set to 5 or another value meeting a system requirement, and the specific setting is related to an actual application process, which is not limited herein.

204: Judge whether the user chooses that the unlock pattern is forgotten.

When the number of times when the user inputs the wrong unlock pattern reaches the preset threshold, the operating system displays an interface requiring the user to choose whether the unlock pattern is forgotten, and then judges whether the user chooses that the unlock pattern is forgotten.

If the user chooses that the unlock pattern is forgotten, step 205 is performed.

If the user chooses that the unlock pattern is not forgotten, step 209 is performed.

205: Display an unlocking interface requiring the user to input two or more pieces of personal information for authentication.

When the user fails in unlocking through a pattern unlocking interface and chooses that the unlock pattern is forgotten, the system displays the unlocking interface requiring the user to input the personal information for authentication. The displaying the unlocking interface requiring the user to input the personal information for authentication may include: displaying prompt information to require the user to input a name of any contact person and a corresponding phone number in address book information of the mobile phone; or, displaying prompt information to require the user to input a name of any contact person and a corresponding phone number in dialed calls; or, displaying prompt information to require the user to input a name of any contact person and a corresponding phone number in sent short messages; or, preferably, in consideration of information security, displaying prompt information to require the user to input two or more pieces of personal information for authentication in combination, for example, displaying prompt information to require the user to input a name of any contact person and the corresponding phone number in address book information of the mobile phone, as well as a name of any contact person and the corresponding phone number in dialed calls, so that information of one contact person in the address book and information of one contact person in the dialed calls are combined as authentication information.

It should be noted that, for the interface requiring the user to input two or more pieces of personal information for authentication, the two or more pieces of the personal information may be input simultaneously on one interface for authentication; or after one piece of personal information is input by the user, an interface requiring the user to input a second piece of personal information is entered, and then authentication is performed for unlocking. There may further be other interfaces requiring the user to input the personal information for authentication, and specific forms of the interfaces may be set according to the actual application process, which is not specifically limited herein.

206: Receive personal information input by the user.

For the content of this step, reference may be made to the content described in step 101 of the embodiment shown in FIG. 1, and details are not described again herein.

207: Judge whether the personal information input by the user matches personal information pre-stored in a local database.

When the user inputs two or more pieces of personal information, the personal information input by the user is combined by the Android system as the authentication information, and then matching is performed on the authentication information and the personal information pre-stored in the local database. It is judged whether the personal information input by the user matches the personal information pre-stored in the local database, and then authentication is performed on the identity of the user, so as to judge whether the user has authority to unlock the system.

Step 208 is performed if the personal information input by the user is consistent with the personal information pre-stored in the local database, and step 209 is performed if the personal information input by the user is inconsistent with the personal information pre-stored in the local database.

It should be noted that, in this embodiment, if the personal information input by the user is inconsistent with the personal information pre-stored in the local database, one specific example is that the system directly returns to the pattern unlocking interface; and also, when the personal information input by the user is inconsistent with the personal information pre-stored in the local database, the number of times of inconsistence may be recorded, and when the number of times of inconsistence reaches a certain threshold, the pattern unlocking interface is returned to. The threshold may be and also may not be the same as the preset threshold in step 203 of this embodiment, which is not specifically limited herein.

208: Unlock the system.

The Android system matches the personal information input by the user with the personal information pre-stored in the local database, and the system is unlocked when the personal information input by the user is consistent with the personal information pre-stored in the local database.

209: Return to the pattern unlocking interface.

The Android system matches the personal information input by the user with the personal information pre-stored in the local database. When it is judged in step 207 that the personal information input by the user is inconsistent with the personal information pre-stored in the local database, the system returns to the pattern unlocking interface, which may enable the user to have a chance to continue unlocking the system through the pattern unlocking interface, in case that the user can input the unlock pattern for unlocking if the user recalls the unlock pattern at this time.

It should be noted that, in step 204, if the user chooses that the unlock pattern is not forgotten, the system may also return to the pattern unlocking interface for unlocking.

In the technical solution provided by the embodiment of the present invention, when the number of times of inputting wrong personal information for authentication reaches a certain number, the system returns to a pattern unlocking manner, so that the user may perform unlocking in two unlocking manners. Therefore, a probability of successful unlocking of the user is increased, and a probability that the user loses user data due to unlocking is reduced.

For convenience in understanding, the method for unlocking an operating system in the embodiment of the present invention is described below with a specific instance.

It is assumed that a mobile phone user H prepares to unlock an Android operating system of a mobile phone. Firstly, a mobile phone interface displays that the user is required to perform unlocking by using a pattern lock password. The user forgets an unlock pattern and therefore keeps inputting a wrong unlock pattern in a process of an unlocking try. At the same time of receiving a password unlock pattern input by the user H each time, the Android operating system judges whether the unlock pattern input by the user is correct. If correct, the system is unlocked; while if incorrect, the number of times when H inputs the wrong unlock pattern is recorded. When the number of times reaches 5, an interface of "whether the unlock pattern is forgotten" is displayed to require the user H to choose whether the unlock pattern is forgotten. If the user H still wants to try pattern unlocking, and chooses "the unlock pattern is not forgotten", the operating system returns to a pattern unlocking interface for the user H to continue to perform unlocking in a pattern unlocking manner. If the user H wants to perform unlocking in a manner other than pattern unlocking, and chooses "the unlock pattern is forgotten", the interface displays an interface for unlocking with personal information. When the interface for unlocking with the personal information is displayed, the user may be required to input any two of the following three types of information: a name of any contact person and a corresponding phone number in an address book of the mobile phone of the user, a name of any contact person and a corresponding phone number in dialed calls, and a name of any contact person and a corresponding phone number in sent short messages. Herein, it is assumed that the personal information which the interface requires the user H to input is the name of any contact person and the corresponding phone number in the address book of the mobile phone of the user H, as well as the name of any contact person and the corresponding phone number in the dialed calls of the user H, and in this case, the user H may input "father 13500000022" and "Zhang Yi 13100000123" according to memory. The system matches two pieces of personal information input by the user H with corresponding personal information pre-stored in a local database of the mobile phone. If the personal information input by the user is consistent with the personal information pre-stored in the local database, the system is unlocked; and if the personal information input by the user is inconsistent with the personal information pre-stored in the local database, the user H is required to re-input personal information. The user is required to return to the pattern unlocking interface to unlock the system when the number of times of inconsistence reaches 3, and the user may also be required to return to the pattern unlocking interface to unlock the system after one time of inconsistence.

Figure 3:
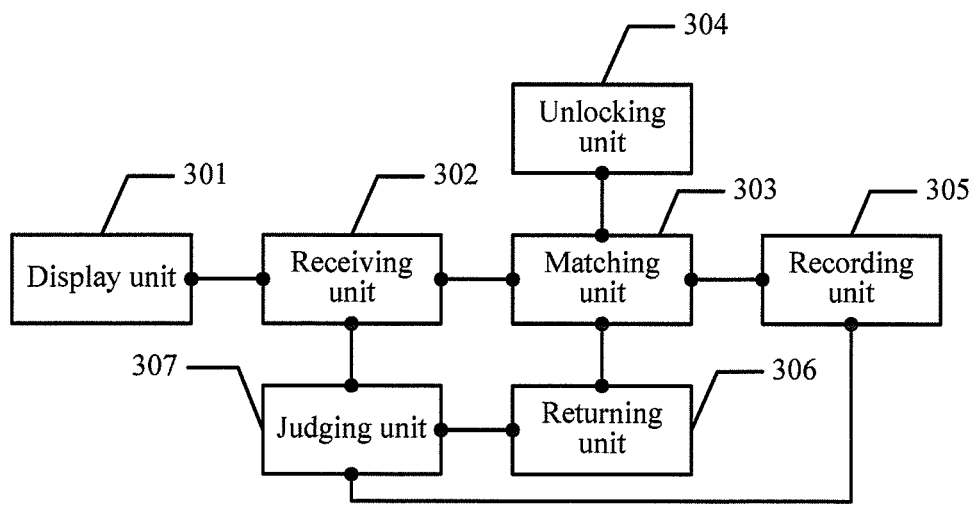
FIG. 3 is a schematic diagram of an embodiment of an apparatus for unlocking an operating system according to an embodiment of the present invention.

An apparatus for unlocking an operating system, provided in an embodiment of the present invention, is described below. Referring to FIG. 3, the apparatus for unlocking an operating system in the embodiment of the present invention includes:

a display unit 301, configured to, when a user fails in unlocking via a pattern, or password unlocking, or gesture unlocking, or sound unlocking or fingerprint unlocking, display an unlocking interface for personal information authentication, and further configured to, when the number of times of inputting a wrong unlock pattern reaches a preset threshold, display an interface requiring the user to choose whether an unlock pattern is forgotten;

a receiving unit 302, configured to receive personal information input by the user, and further configured to receive an unlock pattern input by the user; and a matching unit 303, configured to match the personal information input by the user with personal information pre-stored in a local database.

It should be noted that, the apparatus for unlocking an operating system provided in the embodiment may further include:

an unlocking unit 304, configured to unlock the system if the personal information input by the user is consistent with the personal information pre-stored in the local database;

a recording unit 305, configured to record the number of times when the user inputs the unlock pattern, and record the number of times of inputting the wrong unlock pattern;

a returning unit 306, configured to return to a pattern unlocking interface if the personal information input by the user is inconsistent with the personal information pre-stored in the local database, and further configured to return to the pattern unlocking interface if the user chooses that the unlock pattern is not forgotten; and a judging unit 307, configured to judge whether the unlock pattern is correct.

For convenience in understanding, a connection between the units in the apparatus for unlocking an operating system in this embodiment is illustrated below with a specific application scenario.

In this embodiment, a user of an Android system of a mobile phone firstly tries to unlock the system by using a pattern lock password. The receiving unit 302 receives an unlock pattern input by the mobile phone user, where the unlock pattern is used for unlocking a pattern lock set by the system. Meanwhile, the recording unit 305 records the number of times when the user inputs the unlock pattern for unlocking the system pattern lock, and the judging unit 307 judges whether the unlock pattern input by the user is correct. If the unlock pattern is correct, the unlocking unit 304 unlocks the system, and if the unlock pattern is incorrect, the recording unit 305 records the number of times when the user inputs a wrong unlock pattern. When the number of times when the user inputs the wrong unlock pattern reaches a preset threshold, the display unit 301 displays an interface requiring the user to choose whether the unlock pattern is forgotten. For specific setting of the preset threshold, reference may be made to related content described in step 203 of the embodiment shown in FIG. 2, and details are not described again herein.

If the user chooses that the unlock pattern is not forgotten, the returning unit 306 enables the system to return to a pattern unlocking interface; while if the user chooses that the unlock pattern is forgotten, the display unit 301 displays an unlocking interface for personal information authentication, the receiving unit 302 receives personal information input by the user, and the matching unit 303 matches the personal information input by the user with personal information pre-stored in a local database.

It should be noted that, for a specific process that the display unit 301 requires the user to input the personal information for authentication, reference may be made to the content described in step 205 of the embodiment shown in FIG. 2, and for a matching process executed by the matching unit 303, reference may be made to the content described in step 207 of the embodiment shown in FIG. 2, so the details are not described again herein.

If the matching unit 303 matches the personal information input by the user with the personal information pre-stored in the local database to obtain a result of consistence, the unlocking unit 304 unlocks the system; while if the personal information input by the user is inconsistent with the personal information pre-stored in the local database, the returning unit 306 makes the system return to the pattern unlocking interface.

It should be noted that, in this embodiment, if the personal information input by the user is inconsistent with the personal information pre-stored in the local database, one specific example is that the returning unit 306 makes the system return to the pattern unlocking interface; and also when the personal information input by the user is inconsistent with the personal information pre-stored in the local database, the recording unit 305 may record the number of times of matching failure, and when the number of inconsistence reaches a certain threshold, the pattern unlocking interface is returned to. For specific content, reference may be made to related content described in step 207 of the embodiment shown in FIG. 2, and details are not described again herein.

In the technical solution provided by the embodiment of the present invention, the receiving unit 302 receives the unlock pattern input by the mobile phone user, the system is unlocked if the unlock pattern is correct, and the number of wrong times is recorded if the unlock pattern is wrong. When the number of times when the user inputs the wrong unlock pattern reaches a second preset threshold, the display unit 301 displays the interface requiring the user to choose whether the unlock pattern is forgotten. If the user chooses that the unlock pattern is not forgotten, the returning unit 306 makes the system return to the pattern unlocking interface; if the user chooses that the unlock pattern is forgotten, the display unit 301 displays the unlocking interface for the personal information authentication, and after the receiving unit 302 receives the personal information input by the user, the matching unit 303 matches the personal information input by the user with the personal information pre-stored in the local database. The unlocking unit 304 unlocks the system if the personal information input by the user is consistent with the personal information pre-stored in the local database. The recording unit 305 records the number of times of inconsistence if the personal information input by the user is inconsistent with the personal information pre-stored in the local database. The returning unit 306 makes the system return to the pattern unlocking interface when the number of times of inconsistence reaches a first preset threshold. Because the personal information is easy to remember for the user, the user generally unlocks the system in a manner of inputting the personal information to pass the authentication of the operating system, and the user may also try unlocking with the unlock pattern again by returning to the pattern unlocking interface. Therefore, a probability of successful unlocking of the user is increased, and a probability that the user loses user data due to unlocking is reduced.

Figure 4:
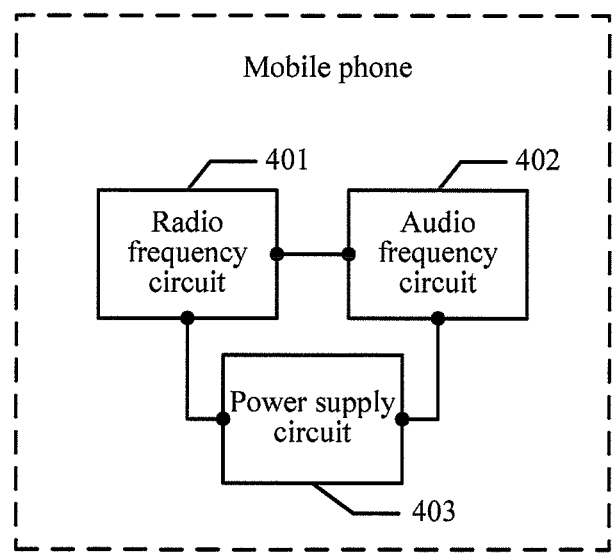
FIG. 4 is a schematic diagram of another embodiment of an apparatus for unlocking an operating system according to an embodiment of the present invention.

The foregoing unlocking apparatus may be set in a mobile phone, a computer, an MP3, an MP4, a human-computer interaction terminal, an e-book or another terminal device with a display function. In a case that the terminal device is a mobile phone, the mobile phone further includes a radio frequency circuit, an audio frequency circuit and a power supply circuit, so as to accomplish basic functions of the mobile phone. The radio frequency circuit, the audio frequency circuit and the power supply circuit are separately introduced below with reference to FIG. 4.

A radio frequency circuit 401 is mainly configured to establish communication between the mobile phone and a wireless network to implement receiving and sending of data between the mobile phone and the wireless network.

An audio frequency circuit 402 is mainly configured to collect sound and convert the collected sound into sound data, so that the mobile phone sends the sound data to the wireless network through the radio frequency circuit; or restore sound from sound data received by the mobile phone from the wireless network through the radio frequency circuit, and play the sound to a user. Alternatively, the audio frequency circuit has the foregoing functions of collecting and sending sound data, and receiving and playing sound data at the same time.

A power supply circuit 403 is mainly configured to supply power to each circuit or component of the mobile phone, so as to guarantee normal operation of the mobile phone.

Persons of ordinary skill in the art can understand that all or part of the steps in the foregoing method embodiments may be completed by a computer program instructing relevant hardware. The program may be stored in a computer readable storage medium. The aforementioned storage medium may be a read-only memory, a magnetic disk, an optical disk, or the like.

A method and an apparatus for unlocking an operating system which are provided by the present invention are described above in detail. Persons of ordinary skill in the art may make modifications to the specific implementations and application scopes according to the idea of the embodiments of the present invention. In conclusion, the content of the specification shall not be construed as a limitation to the present invention.

What is claimed is:

1. A method for unlocking a system associated with an electronic device, the method comprising:
   receiving an unlock pattern which is input by a user and is for unlocking the system in an unlocking interface for pattern unlocking;
   determining whether the unlock pattern is correct or not, and if the unlock pattern is not correct, recording the number of times the user inputs a wrong unlock pattern;
   when the number of times the user inputs the wrong unlock pattern reaches a preset threshold, displaying an interface requiring the user to indicate whether the unlock pattern is forgotten;
   when an indication that the unlock pattern is not forgotten is received, returning to displaying the unlocking interface for the pattern unlocking; and
   when an indication that the unlock pattern is forgotten is received:
      displaying the unlocking interface for personal information authentication;
      receiving at least two pieces of personal information input by the user via the unlocking interface;
      matching the at least two pieces of personal information input by the user with personal information pre-stored in a local database, wherein the personal information pre-stored in the local database is obtained through normal operation of the electronic device unrelated to unlocking or to a security function; and
      after matching the at least two pieces of personal information input by the user with the personal information pre-stored in the local database:
         unlocking the system if the at least two pieces of personal information input by the user are consistent with the personal information pre-stored in the local database; or
         returning to the unlocking interface for pattern unlocking if the at least two pieces of personal information input by the user are inconsistent with the personal information pre-stored in the local database.

2. The method according to claim 1, wherein the at least two pieces of personal information comprise information from at least one of the following: contact information of a mobile phone address book, a mobile phone call record, a short message or multimedia message received by the user or a short message or multimedia message sent by the user.

3. The method according to claim 1, further comprising:
   when the user fails in unlocking via a password, or gesture unlocking, or sound unlocking or fingerprint unlocking, displaying the unlocking interface for the personal information authentication.

4. The method according to claim 1, wherein the at least two pieces of personal information comprise a name of any contact person and a corresponding phone number stored in an address book of the electronic device.

5. The method according to claim 1, wherein the at least two pieces of personal information comprise a name of a contact person and a corresponding phone number of a dialed call.

6. The method according to claim 1, wherein the at least two pieces of personal information comprise a name of a contact person and a corresponding phone number of a short message.

7. An apparatus for unlocking a system, the apparatus comprising:
   a receiving unit configured to receive an unlock pattern which is input by a user and is for unlocking the system in an unlocking interface for pattern unlocking;
   a judging unit configured to determine whether the unlock pattern is correct;
   a recording unit configured to record, if the unlock pattern is not correct, the number of times the user inputs a wrong unlock pattern; and
   a display unit configured to, when the number of times the user inputs the wrong unlock pattern reaches a preset threshold, display an interface requiring the user to indicate whether the unlock pattern is forgotten, and when an indication that the unlock pattern is not forgotten is received, return to displaying the unlocking interface for pattern unlocking;
   wherein, when an indication that the unlock pattern is forgotten is received:
      the display unit is further configured to display the unlocking interface for personal information authentication;
      the receiving unit is further configured to receive at least two pieces of personal information input by the user via the unlocking interface;
      a matching unit is configured to match the at least two pieces of personal information input by the user with personal information pre-stored in a local database, wherein the personal information pre-stored in the local database is obtained through normal operation of the apparatus unrelated to unlocking or to a security function;
      an unlocking unit is configured to unlock the system if the at least two pieces of personal information input by the user are consistent with the personal information pre-stored in the local database; and
      a returning unit is configured to return to the pattern unlocking interface if the at least two pieces of personal information input by the user are inconsistent with the personal information pre-stored in the local database.

8. The apparatus according to claim 7, wherein the at least two pieces of personal information comprise a name of any contact person and a corresponding phone number stored in an address book of the apparatus.

9. The apparatus according to claim 7, wherein the apparatus is a mobile phone, and the mobile phone further comprises:
   a radio frequency circuit, a microphone, a loudspeaker and a power supply circuit, wherein:
   the radio frequency circuit is configured to establish communication between the mobile phone and a wireless network to implement receiving and sending of data between the mobile phone and the wireless network;
   the microphone is configured to collect sound and convert the collected sound into sound data, so that the mobile phone sends the sound data to the wireless network through the radio frequency circuit;
   the loudspeaker is configured to restore sound from sound data received by the mobile phone from the wireless network through the radio frequency circuit, and play the sound to the user; and
   the power supply circuit is configured to supply power to each circuit or component of the mobile phone.

10. The apparatus according to claim 7, wherein the at least two pieces of personal information comprise information from at least one of the following: contact information of a mobile phone address book, a mobile phone call record, a short message or multimedia message received by the user or a short message or multimedia message sent by the user.

11. The apparatus according to claim 7, wherein the at least two pieces of personal information comprise a name of a contact person and a corresponding phone number of a dialed call.

12. The apparatus according to claim 7, wherein the at least two pieces of personal information comprise a name of a contact person and a corresponding phone number of a short message.

13. A terminal device, comprising:
   a transceiver;
   a memory;
   one or more processors; and
   one or more non-transitory software module stored in the memory and configured for execution by the one or more processors, the one or more modules including instructions to:
      receive an unlock pattern which is input by a user and is for unlocking a system of the terminal device in an unlocking interface for pattern unlocking;
      determine whether the unlock pattern is correct or not, and if the unlock pattern is not correct, record the number of times the user inputs a wrong unlock pattern;
      when the number of times the user inputs the wrong unlock pattern reaches a preset threshold, display an interface requiring the user to indicate whether the unlock pattern is forgotten;
      when an indication that the unlock pattern is not forgotten is received, return to the unlocking interface for the pattern unlocking; and
      when an indication that the unlock pattern is forgotten is received:
         display then unlocking interface for personal information authentication,
         receive at least two pieces of personal information input by the user via the unlocking interface,
         match the at least two pieces of personal information input by the user with personal information pre-stored in a local database, wherein the personal information pre-stored in the local database is obtained through normal operation of the terminal device unrelated to unlocking or to a security function; and
         after matching the at least two pieces of personal information input by the user with the personal information pre-stored in the local database:
            unlock the system if the at least two pieces of personal information input by the user are consistent with the personal information pre-stored in the local database; or return to the unlocking interface for the pattern unlocking if the at least two pieces of personal information input by the user are inconsistent with the personal information pre-stored in the local database.

* * * * *